(12) United States Patent
David

(10) Patent No.: US 6,216,852 B1
(45) Date of Patent: Apr. 17, 2001

(54) CONVEYOR BELT WITH HEAVIER LOWER REINFORCING LAYER

(75) Inventor: Joseph S. David, Franklin, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 09/219,170

(22) Filed: Dec. 22, 1998

(51) Int. Cl.⁷ .................................................. B65G 15/34
(52) U.S. Cl. ................................................... 198/847
(58) Field of Search ........................................... 198/847

(56) References Cited

U.S. PATENT DOCUMENTS

| | | | |
|---|---|---|---|
| 3,212,627 | * 10/1965 | Beebee | 198/847 |
| 3,900,627 | * 8/1975 | Angioletti et al. | 198/847 |
| 4,094,402 | * 6/1978 | Heeke | 198/847 |
| 4,387,801 | * 6/1983 | Hoover | 198/847 |
| 5,004,098 | * 4/1991 | Marshall | 198/847 |

* cited by examiner

Primary Examiner—Robert P. Olszewski
Assistant Examiner—Bryan Jaketic
(74) Attorney, Agent, or Firm—James Earl Lowe, Jr.

(57) ABSTRACT

An elongatable conveyor belt capable of traversing horizontal curves during its conveying run while still allowing for retention of the material to be conveyed thereon, the conveying belt being made of a stretchable or elongatable elastomeric material and including an upper layer of transverse reinforcing cords and a substantially heavier lower layer of transverse reinforcing cords disposed at opposing angles relative to the transverse axis of the conveyor belt. The belt also includes an internal stretch limiter such as an angularly woven fabric in the central region of the belt.

9 Claims, 2 Drawing Sheets

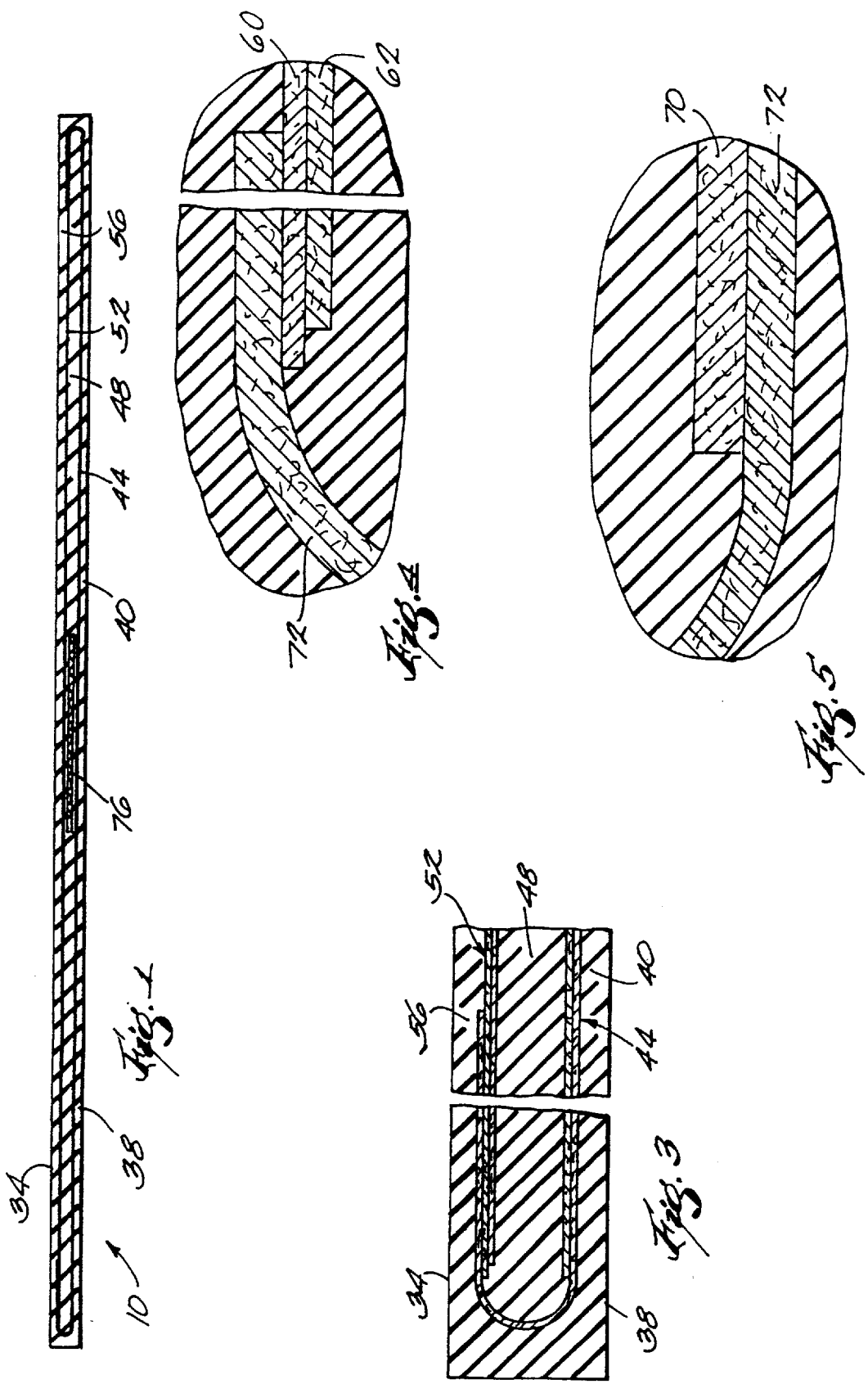

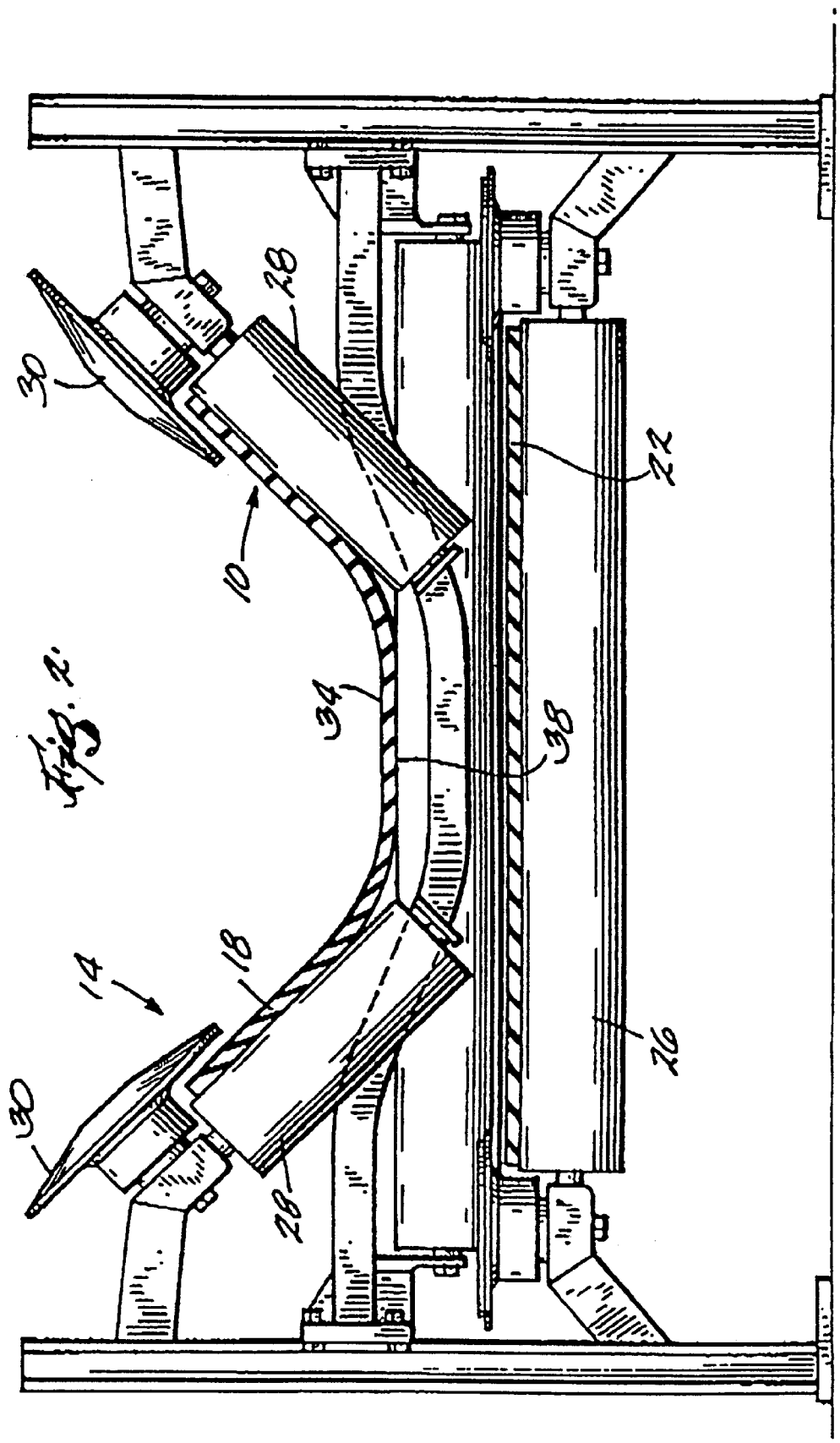

CONVEYOR BELT WITH HEAVIER LOWER REINFORCING LAYER

BACKGROUND OF THE INVENTION

1. Field of the Invention

The present invention relates to conveyor belts and, in particular, to a conveyor belt capable of traversing horizontal curves during its conveying run while still allowing for retention of the material to be conveyed thereon, the conveyor belt being made of a stretchable or elongatable elastomeric material and including upper and lower layers of reinforcing material.

2. Description of the Prior Art

As is known, conveyor belts have been developed for traveling through an orbit with a generally horizontally extending conveying run overlying a generally horizontally extending return run with the conveying and return runs being stretched or elongated to provide tension in the sides of the conveying run so that such sides remain in tension as the conveying run traverses a horizontal curve. A description of such a tensioned conveyor belt is set forth in U.S. Pat. No. 4,387,801 wherein one embodiment of a conveyor belt is disclosed and described having a selected limited elongation for establishing the overall length of an orbital conveyor belt. A conveyor belt including an internal stretch limiter and an upper and lower layer of reinforcing material is disclosed in Marshall U.S. Pat. No. 5,004,098.

A problem with the prior art conveyor belts is that the belt ants to roll out from under edge roller flanges which are intended to hold the belt in turns. Further, the belt wants to lift out from under the edge roller flanges and go straight up in severe dips. The force that the flanges exert on the belt prevent this, but in order for this to be effective, the belt must be relatively stiff. However, in order to take a troughed shape so as to effectively carry material, the belt has to be relatively flexible. The problem thus has been to make the belt flexible enough to trough, but relatively stiff to help resist buckling in the opposite direction. This has resulted in a compromise design. Present conveyor belts have two layers of reinforcing cords near the bottom surface, and two layers near the top surface, and all four of the cords that constitute these layers are the same size. The purpose of this reinforcement is to provide the required stiffness.

SUMMARY OF THE INVENTION

This invention provides an elongatable conveyor belt capable of traversing horizontal curves during its conveying run while still allowing for retention of the material to be conveyed thereon, the conveying belt being made of a stretchable or elongatable elastomeric material and including upper layers of transverse reinforcing cords and substantially heavier lower layers of transverse reinforcing cords. The belt also includes an internal stretch limiter such as an angularly woven fabric in the central region of the belt.

One of the principal features of the invention is to provide a belt with differential stiffness in cross sectional bending. Thus, the belt's top strand will flex more easily to become concave upwards and so will trough as readily as a standard belt, but the bottom strand will resist flexing to become convex upwards and so will resist the bending that allows it to come out from under the edge roller flanges that overhang the belt edges.

Other features and advantages of the invention will become apparent to those skilled in the art upon review of the following detailed description, claims and drawings.

BRIEF DESCRIPTION OF THE DRAWINGS

FIG. 1 is a cross sectional view of the conveyor belt according to the present invention;

FIG. 2 is an cross sectional view of a conveying apparatus including the conveyor belt of the invention;

FIG. 3 is a partially broken away enlarged view of one end of the conveyor belt shown in FIG. 1;

FIG. 4 is a further enlargement of the upper corner of the end of the conveyor belt shown in FIG. 3; and FIG. 5 is a further enlargement of the lower corner of the end of the conveyor belt shown in FIG. 3.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof, as well as additional items. Use of "consisting of" and variations thereof as used herein is meant to encompass only the items listed thereafter and equivalents thereof.

DETAILED DESCRIPTION OF THE PREFERRED EMBODIMENTS

Referring now to the drawings, the figures show a conveyor belt generally designated as 10. As is known, conveyor belts may be formed from materials such as natural rubber or various rubber compounds such as neoprene, which materials will be referred to herein as "rubber", as well as reinforcing materials. Conveyor belts, such as those previously used in conveying coal commonly comprise a plurality of elongated belt sections (not shown) joined at each end to an end of an adjacent elongated section by means of a connector to form an elongated orbital conveying belt 10. A typical conveyor apparatus 14 which uses such a belt 10 is illustrated in FIG. 2. The conveyor belt 10 provides an upper conveying run 18 which overlies a return run 22 with the end portions of the orbital belt 10 traveling over belt reversing end rollers (not shown). Such belts 10 are typically frictionally driven by the end rollers by suitable means connectable to shafts on the end rollers. Additionally, rollers 26 are typically provided along the length of the belt 10 and may cause the belt 10 to traverse a varied horizontal and vertical path which may particularly include horizontal curves. Further, side rollers 28 may be provided to deflect the lateral edges of the belt 10 in order to retain material in the central portion thereof. Flanged edge rollers 30 are also provided to guide the belt 10 around horizontal curves and to keep the belt from rolling out on those turns or lifting up in vertical dips. The conveyor belt 10 includes an upper surface 34 on which the material to be conveyed may be placed and a lower surface 38 which is engaged by the driving and/or support rolls.

The structure of the conveyor belt 10 includes a lower or first rubber body component 40 upon which two layers of angularly disposed reinforcing cords 70, 72 are provided (shown together as 44 in FIG. 1). These cords are preferably of polyester material. The individual cords in the first layer 72 are laid at an angle of +7½° to the transverse axis of the belt and the individual cords of the second layer 70 are laid at an angle of −7½° to the transverse axis so that the cords of layer 70 are at an included angle of 15° with respect to the cords of layer 72. The conveyor belt 10 further includes an intermediate rubber body component 48. In addition, two upper layers 60, 62 of polyester reinforcing cords are provided substantially above the intermediate component 48 within the conveyor belt 10. (These layers are shown together as 52 in FIG. 1) The upper two layers 60, 62 are also at plus and minus 7½° to the transverse axis of the belt and so the cords of these layers also lie at 15° included angle with respect to each other. A rubber body component 56 is provided in the upper portion of belt 10.

The cords of layers 70, 60 and 62 are substantially the same length and extend not quite the full width of the belt. However, the cords of layer 72 are substantially longer so that they may wrap around the ends of cords 70, 60 and 62 as is shown in FIG. 3.

In the prior art the cords of all four layers are the same diameter. In this invention, however, a substantially heavier or larger diameter cord is used in the lower layers 70 and 72. The heavier cords in the lower layers increase the stiffness of the belt in cross-sectional bending when in compression, while the same cords in tension have a negligible effect. Thus, by putting heavier cords near the bottom surface 38 of the belt 10, the belt 10 will trough as readily as a standard belt but will resist coming out of its path with twice the strength of a standard belt. It can be seen in FIG. 2 that edge rollers 30 have flanges that overhang the edges of the belt. In horizontal turns the edge of the belt wants to rise into this flange and if unrestrained would rise and roll out of the set of rollers that guides it. It is the strength to resist this rolling out that is provided by the heavier cords since they resist the bending of the belt in its cross section that must accompany the distortion required to disengage from the overhanging flange. This is critical for wider belts such as 42 inch wide belts. Further, with this construction, the belt top strand resists loads pushing down on the edges, but conforms more readily to loads pushing up.

In other embodiments, less or more layers of cords can be used in either the upper or lower composite layers. It is only necessary that at least one layer of cord in the lower composite layer be heavier, thereby increasing the resistance to compression of the belt 10 in the lower layer of the belt. More particularly, in the preferred embodiment, the two upper layer cords are 1000 two ply polyester cords, and the two lower layer cords are 1000 four ply polyester cords. Further, in the preferred embodiment, the belt is about 42 inches (106 cm) wide and about ⅞ths inch (2.2 cm) deep. As illustrated in FIGS. 3 through 5, the lowermost cord 72 is turned upwardly at the edges of the belt 10, and then placed over the uppermost cord 60 in the upper layer of the belt 10 a distance of about 3 inches (7.5 cm) from the edge of the belt 10, in order to help reinforce the belt edges.

The conveyor belt 10 further includes an internal stretch limiting means 76 in the lateral center of the intermediate body section 48. The internal stretch limiter 76 preferably comprises an angularly woven high strength band which is embedded into the belt 10. The internal stretch limiter 76 is preferably formed of an aramid fiber such as that sold under the trademark KEVLAR® by E. I. DuPont de Nemours & Company. The weave of the stretch limiter 76 has the property of elongating a predetermined distance when subject to tension during the initial stretching of the belt 10, and then its resistance to further elongation increases rapidly to resist any appreciable over-stretching of the belt 10 in operation. Preferably, the various components of the belt 10 are laid out and then passed through a vulcanizing press and the belt is vulcanized at a temperature of approximately 300° F. and at a pressure of 300 p.s.i. for approximately one hour. During such a process, the rubber-like material passes into the interstices between the cords in the lower and upper reinforcing layers 44 and 52, respectively, and in the stretch limiting means 76.

The conveyor belts produced in accordance with the present invention serve to provide an internal stretch limiting means which allows the conveyor belts 10 to be elongated by a predetermined distance; however, once the predetermined amount is reached, resistance to further elongation increased rapidly. The belt 10 is elongatable only up to 10% and preferably 8%, during installation and start-up of the belt 10.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. An elongatable conveyor belt capable of traversing horizontal curves during its conveying run while still allowing for retention of the material to be conveyed thereon, the conveying belt being made of a stretchable or elongatable elastomeric material and including an upper layer of at least one layer of transverse reinforcing cord and a lower layer of at least one layer of substantially heavier transverse reinforcing cord.

2. An elongatable belt according to claim 1 wherein said lower layer is disposed at angles opposing the upper layer relative to the transverse axis of the conveyor belt.

3. An elongatable belt according to claim 1 wherein said belt also includes an internal stretch limiter.

4. An elongatable belt according to claim 1 wherein said internal stretch limiter is an angularly woven fabric in the central region of the belt.

5. An elongatable belt according to claim 1 wherein said upper layer includes two cord layers disposed one above the other and said lower layer includes two cord layers disposed one above the other.

6. A stretchable conveyor belt, comprising:

an elongated elastomeric body having spaced-apart edges, a load-carrying belt surface on one side of said body extending between said edges and a drivable surface on the other side of said body;

a first set of two layers of reinforcing cords extending from one of said edges to the other of said edges laid on a bias to each other and on plus or minus ½ of that bias to the transverse axis of the belt;

a second set of two layers of reinforcing cords coextensive with and positioned below said first layer and laid at a similar bias angle to the cords of said first layer, said second layer being substantially heavier than said first layer; and stretch limiting means provided between said first and second layers in the lateral center of said belt and extending less than one-half of the width of said belt, said stretch limiting means having the property of elongating a predetermined distance when subject to tension and then having a rapidly increasing resistance to further elongation of the belt in operation.

7. The conveyor belt of claim 6 in which said stretch limiting means extends less than 10% of the width of said belt.

8. An elongatable belt according to claim 6 wherein said lower layer is disposed at angles opposing the upper layer relative to the transverse axis of the conveyor belt.

9. An elongatable belt according to claim 6 wherein said stretch limiting means is an angularly woven fabric in the central region of the belt.

* * * * *